United States Patent [19]
Williams

[11] Patent Number: 4,871,626
[45] Date of Patent: Oct. 3, 1989

[54] CURRENT COLLECTOR FOR AMTEC

[75] Inventor: Roger M. Williams, Azusa, Calif.

[73] Assignee: California Institute of Technology, Pasadena, Calif.

[21] Appl. No.: 82,888

[22] Filed: Aug. 6, 1987

[51] Int. Cl.$^4$ .................... H01M 6/36; H01M 10/44
[52] U.S. Cl. ........................................ 429/11; 429/50; 429/104; 429/112
[58] Field of Search .................... 429/11, 104, 112, 50

[56] References Cited

U.S. PATENT DOCUMENTS

| | | | |
|---|---|---|---|
| 3,932,195 | 1/1976 | Evans et al. | 429/104 |
| 4,452,777 | 6/1984 | Abraham et al. | 429/104 |
| 4,510,210 | 4/1985 | Hunt | 429/104 X |
| 4,675,257 | 6/1987 | Winchester | 429/112 |

Primary Examiner—Stephen J. Kalafut
Attorney, Agent, or Firm—Jacobs, Marvin E.

[57] ABSTRACT

An electrode having higher power output is formed of an open mesh current collector such as expanded nickel covering an electrode film applied to a tube of beta-alumina solid electrolyte (BASE). A plurality of cross-members such as spaced, parallel loops of molybdenum metal wire surround the BASE tube. The loops are electrically connected by a bus wire. As the AMTEC cell is heated, the grid of expanded nickel expands more than the BASE tube and the surrounding loop of wire and become diffusion welded to the electrode film and to the wire loops.

19 Claims, 4 Drawing Sheets

CURRENT COLLECTOR FOR AMTEC

ORIGIN OF THE INVENTION

The invention described herein was made in the performance of work under a NASA contract, and is subject to the provisions of Public Law 96-517 (35 USC 202) in which the Contractor has elected to retain title.

TECHNICAL FIELD

The present invention relates to highly efficient thermoelectric conversion devices and, more particularly, this invention relates to an improved current collector for an alkali metal thermoelectric converter (AMTEC).

BACKGROUND OF THE INVENTION

New types of primary energy sources are needed to power electronic devices, electric vehicles and to smooth peak power demands on electric utilities. Promising devices for electrochemical energy conversion are based on the direct conversion of heat energy to electrical energy without use of moving mechanical parts.

Direct conversion of heat energy to electrical energy has both aesthetic and practical appeal. Several devices for thermoelectric direct conversion have been developed. The Seebeck effect, thermionic, and magnetohydrodynamic generators are familiar examples. None of these direct converters has been widely adopted because of practical problems such as parasitic heat loss or lack of a critical material with the physical properties necessary for high efficiency and good durability.

Among the less well known direct thermoelectric converters are the thermally regenerative electrochemical systems (TRES). These devices are closed electrochemical cells that produce electrical power. The reactants for these cells are regenerated within the device by thermal energy from a heat source which flows through the device to a heat sink. TRES have also been called electrochemical heat engines, by analogy with the well-known heat engines in which a working fluid is carried around a thermodynamic cycle. Many types of TRES were investigated in the 1950's and 1960's in the search for improved methods of converting the thermal output of nuclear reactors to electrical power.

All of the early TRES were plagued by practical problems such as inefficient heat exchange, electrode polarization, slow chemical regeneration kinetics, materials separation problems, and corrosion. Power densities of these early systems were usually limited to a few tens of milliwatts per square centimeter of electrode area, and thermoelectric efficiencies were below five percent.

A thermally powered sodium concentration cell based on a unique solid electrolyte was developed in 1968. This led to the development of the alkali metal thermoelectric converter (AMTEC) which is the first TRES with efficiency and power density comparable to conventional heat engines.

The alkali metal thermoelectric converter (AMTEC) is a device for the direct conversion of heat to electrical energy. The sodium ion conductor, beta-alumina, is used to form a high-temperature regenerative concentration cell for elemental sodium. An AMTEC can operate with an efficiency of 20 to 40 percent, a power density of 0.5 kilowatt per kilogram or more, while having no moving parts, low maintenance requirements, and high durability. Efficiency is independent of size. AMTEC devices should be usable with high-temperature combustion, nuclear, or solar heat sources. A wide range of applications from aerospace power to utility plants appears possible.

Improved power density from an AMTEC device was achieved by coating the beta-alumina with a 1–5 millimicron thick porous layer of a transition metal such as molybdenum. As disclosed in U.S. Pat. No. 4,175,164, the layer had good conductivity at the high temperature experienced in the device. Liquid sodium molybdate formed which facilitated sodium transport, as ions, through the porous electrode. However, only about 70 to 80 percent of theoretical efficiency was achieved and a two- to five-fold reduction in specific power output and efficiency were experienced after 10-1000 hours of operation. The voltage drop was related to electrode degradation. The flow resistance of sodium increased as sodium molybdate evaporated and less efficient gas diffusion of sodium through pores became the dominant transport process (3). The electrode was not capable of extended operation at high power levels. Many applications require operation of an AMTEC cell with porous electrodes at high specific power for periods of 10,000 hours or more.

Thus, the only remaining fundamental limitation of AMTEC devices is the provision of a long life (more than 10,000 hours) electrode with a negligible contribution to the internal impedance of the device.

Electrodes thinner than 1 millimicron would minimize the pressure difference across the electrode film and thus reduce sodium vapor transport resistance in the porous metallic film. However, very thin films present an increased sheet resistance that provides an excessive impedance to the AMTEC cell.

Very thin, porous molybdenum films having a thickness less than 1 millimicron and a current collector formed of fine, molybdenum grid lines connected by loops of molybdenum wire exhibit high power densities as disclosed in copending application entitled THIN METAL ELECTRODE FOR AMTEC filed concurrently herewith, the disclosure therein, being expressly incorporated herein by reference. AMTEC devices utilizing this electrode exhibit high power densities of over 0.3 watts/cm$^2$ over extended periods of operation at high temperature. The thin electrodes allow efficient sodium vapor flow through the electrode, thus reducing the voltage loss. The thin film exhibits a high sheet resistance which is offset by the use of a current collector. The wired molybdenum grids provide an excessive contact resistance even when brazed to the thin film. Furthermore, the wired grids do not reliably adhere to the thin film.

STATEMENT OF THE INVENTION

An improved current collector for an AMTEC device is provided by the present invention. The current collector firmly and reliably attaches to the thin film to provide a low contact resistance interface.

The current collector is formed of a mesh of a high temperature, refractory metal having a coefficient of expansion larger than that of outer tie members and of the BASE substrate with an electrode film. The metal for forming the mesh should have a coefficient of expansion at least 1.5 times that of the BASE element suitably from 1.75 to 5.0 times that of the BASE element. The metal for forming the mesh can be any refractory metal that is a good conductor such as nickel or cobalt or it can be a composite such as a copper sheet clad with a layer of nickel, cobalt, molybdenum or tungsten.

As the AMTEC device is heated to high temperature, the mesh expands more than the outer tie members and the underlying BASE tube. The sandwiched mesh firmly bonds to the adjacent surfaces of the tie members and the portion of the electrode film on the BASE underlying the tie member to form an in-situ diffusion weld. A considerable reduction of the contact resistance is achieved as compared to the wired molybdenum grid.

The mesh is preferably an expanded metal mesh of good conductor such as nickel or cobalt. The mesh has an open area of at least 20%, preferably from 60 to 85%. The mesh is as thin as practical, generally from 0.1 to 5 mm, typically about 1 mm. More efficient utilization of the total area of the electrode is provided with the use of very fine meshes having opening of 5 mm$^2$ or less, preferably about 1 mm$^2$ or less.

The current collector of the invention is useful with thin or thick electrode films and with the alloy films disclosed in copending application Ser. No. 895,360, filed Aug. 11, 1986 and the CIP of said application entitled ALKALI METAL-REFRACTORY METAL BIPHASE ELECTRODE FOR AMTEC, filed concurrently herewith. The disclosures of which are expressly incorporated herein by reference.

The electrode of the invention preferably includes a thin, porous film (less than 1 micrometer thick) of a refractory metal which is insoluble in sodium or in any liquid phase which may form.

The thin film is formed of an early transition, refractory metal selected from Groups IVB, VB, VIB of the Periodic Table such as Mo, W, Nb or Ta which all resist sodium dissolution. Refractory metals are those metals that melt or evaporate at a temperature above the maximum operating temperature of the cell, usually above 1500K. The electrode can also include a thick (1 to 5 micrometer) film of said metal and a second refractory metal such as a platinum group metal.

These and many other features and advantages of the invention will become apparent as the invention becomes better understood by reference to the following description.

LIST OF CITED REFERENCES

| U.S. Pat. No. | Patentee |
|---|---|
| 3,458,356 | J. T. Kummer et al |
| 3,481,787 | O. J. Adlhart |
| 3,563,730 | Richardo O. Bach et al |
| 3,930,888 | George C. Bowser et al |
| 4,042,757 | Ivor W. Jones |
| 4,049,877 | Roger B. Saillant et al |
| 4,080,489 | Arabinda N. Dey |
| 4,098,959 | Max Bettman |
| 4,175,164 | Terry Cole |
| 4,452,777 | Abraham et al |
| 4,505,991 | Neill Weber |
| 4,510,210 | Thomas K. Hunt |
| 4,547,442 | Jurgen O. Besenhard et al |

LITERATURE

1. C. P. Bankston, T. Cole, R. Jones, and R. Ewell, J. Enegy, 7, 442 (1983).
2. C. P. Bankston, T. Cole, S. K. Khanna, and A. P. Thakoor, in "Space Nuclear Power Systems 1984," Vol. II, p. 393, M. S. El-Genk and M. D. Hoover, Editors, Orbit Book Co., Malabar, FL (1985).
3. R. M. Williams, G. Nagasubramanian, S. K. Khanna, C. P. Bankston, A. P. Thakoor, and T. Cole, J. Electrochem. Soc., 133, 1587 (1986).
4. R. M. Williams, C. P. Bankston, S. K. Khanna, and T. Cole, J. Electrochem. Soc., 133, 2253 (1986).

DISCUSSION OF THE PRIOR REFERENCES

These patents do not disclose an electrode for an AMTEC device formed of a combination of a fine grid applied to an electrode film of an early transition, refractory metal. The Cole, Jones and Saillant patents disclose the use of thick porous molybdenum or tungsten electrode film on a beta-alumina solid electrolyte (BASE) in an AMTEC cell. Weber discloses use of platinum on an AMTEC converter. Besenhard et al shows use of a lithium-molybdenum alloy in a battery to achieve good electrical contact. Adlhart relates to a fuel cell utilizing a catalytic Raney alloy anode comprising platinum and zirconium, rhenium or tungsten. Dey uses platinum to bond lithium to a stainless steel current collector. The remaining references relate to various structural or operational improvements in AMTEC cells.

(1) 2.5 micrometer Mo film exposed to sodium molybdate vapor, 1150K;
(2) 0.5 micrometer Mo film with grid, 1150K;
(3) 0.5 micrometer Mo film without grid, 1100K;
(4) 0.5 micrometer W film with grid, 1180K; and
(5) 2.0 micrometer Pt/W film with grid, 1150K.

DETAILED DESCRIPTION OF THE INVENTION

Figure 1:
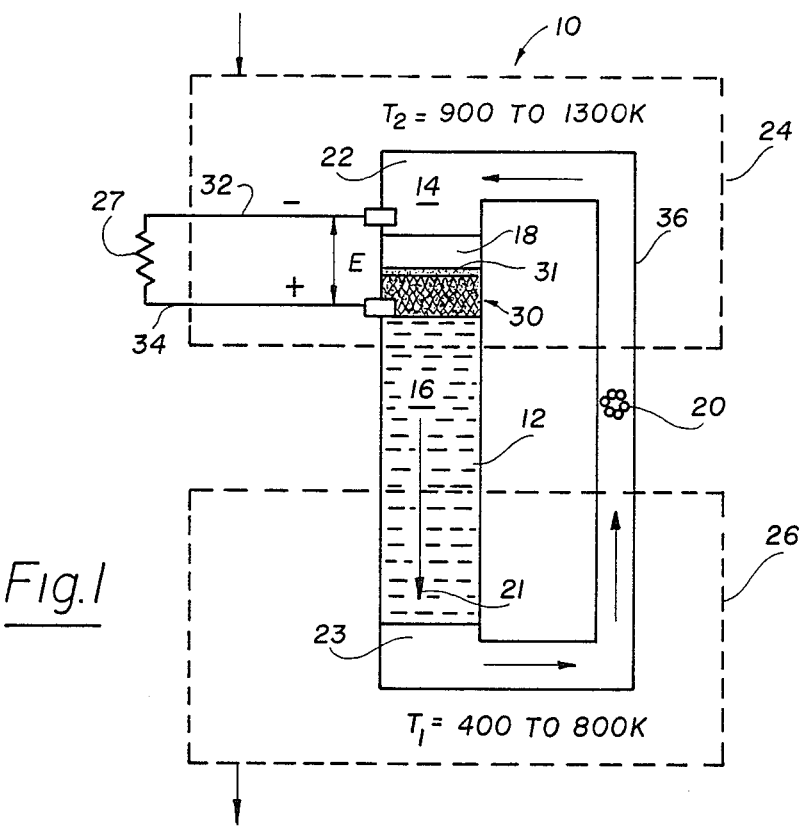
FIG. 1 is a schematic diagram illustrating the thermodynamic cycle of an AMTEC device containing the electrode of the invention.

The operating cycle of an AMTEC device 10 is illustrated diagrammatically in FIG. 1. A closed vessel 12 is divided into two regions 14, 16 by a separator 18 of BASE and an electrode 30 comprising a film 31 of refractory metal covered by an open current collector 33. Liquid sodium 22 fills the upper region 14 which is maintained at a temperature $T_2$ in the range of 900 to 1300K by an external heat source 24. In this temperature range the vapor pressure of sodium is 0.05 to 2.5 atm ($5.0 \times 10^3$ to $2.5 \times 10^5$ Pa). The lower region 16 containing mostly low pressure sodium vapor 21 and a small amount of liquid sodium 23, is in contact with a heat sink condenser 26 at $T_1$ in the range of 400 to 800K which produces a sodium vapor pressure range of $10^{-9}$ to $10^{-2}$ atm ($10^{-4}$ to $10^3$ Pa). The metal electrode 30 covers the low-pressure side of the BASE separator 18.

Electrical leads 32, 34 are connected to the electrode 30 and to the high temperature liquid sodium 22. The leads 32, 34 exit through the wall of the device and connect to a load 27. Nearly all of the temperature drop across the AMTEC occurs in the low-pressure vapor space 16. An electromagnetic pump 20, recirculates the sodium working fluid through the liquid return tube 36 of the AMTEC to complete the cycle. Other means of recirculating sodium may also be employed.

At the beginning of the AMTEC cycle, sodium at temperature $T_1$ from the condenser 26 enters the hot zone and absorbs externally supplied thermal energy from the heat source 24 until the sodium reaches $T_2$. The temperature-generated pressure (chemical potential) differential across the BASE forces Na+ ions in the solid toward the low-pressure surface. Since BASE will conduct sodium only as Na+ ions the reaction

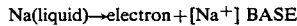

Na(liquid)→electron+[Na+] BASE dium flows. The symbol [Na+] BASE indicates a sodium ion in the conduction plane of beta-alumina. At open circuit, Na+ ions are driven by thermal kinetic energy toward the low-pressure BASE surface, causing this surface to acquire a net positive charge. The electrical field in the BASE builds up until it is strong enough to stop the flow of Na+.

Figure 2:
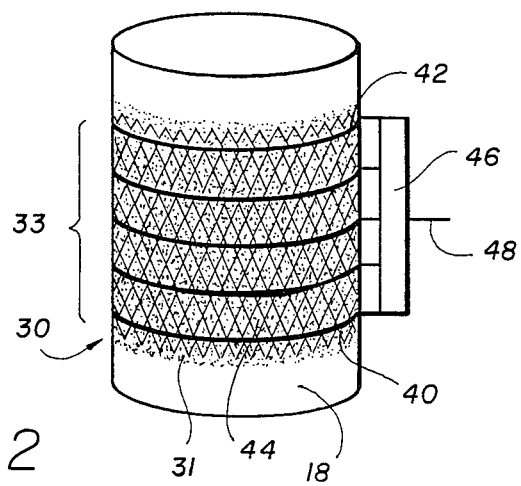
FIG. 2 is a schematic perspective diagram of the AMTEC electrode of the invention.

Referring now to FIG. 2, the composite, metal film-grid electrode of the invention is illustrated. The BASE separator 18 has a body 22 of the liquid sodium on the upstream side and a film-grid electrode 30 on the downstream side of the BASE separator. The film 31 of the electrode 30 contains pores. During operation of the AMTEC, sodium 22 traverses the BASE separator 18 as ions and the electrode film 31 in a condensed phase. It is converted to a gas as it leaves the electrode film 31 and flows through the openings 44 in the grid 33 into the vapor space 16. The rapid sodium mobility on the surface of, or through, the thin film makes possible the highly efficient and sustained operation of the AMTEC cell.

Beta-alumina and beta''-alumina or their mixtures are members of the class of materials known as solid electrolytes or fast ion conductors. These materials have ionic conductivities much larger than their electronic conductivities and thus act as permselective barriers. Beta''-alumina solid electrolyte (BASE) has a much higher sodium conductivity than Beta-alumina and is a transparent crystalline solid melting at 2253K, having the nominal composition $Na_{5/3}Li_{1/3}Al_{32/3}O_{17}$ and is usually fabricated as a dense mi sintered ceramic. It is inert to reaction with elemental sodium at temperatures as high as 1300K. Its Na+ conductivity at 1000K is 0.7 $ohm^{-1}cm^{-1}$.

The solid electrolyte can assume different configurations such as a flat barrier film or the solid electrolyte can be provided in cylindrical form. The surface can be planar or corrugated. The solid electrolyte is usually fairly thin, typically having a thickness from 0.01 to 0.2 cm, generally around 0.1 cm. In a commercial AMTEC device, the electrodes on the solid electrolyte would completely cover the outside surface of the solid electrolyte.

Figure 3:
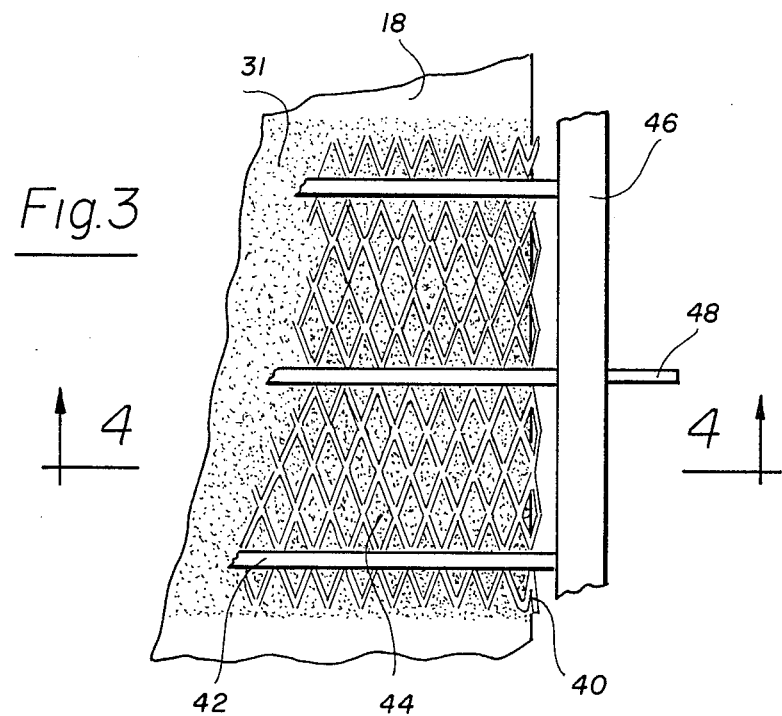
FIG. 3 is an enlarged view in elevation of a portion of the electrode shown in FIG. 2.
Figure 4:
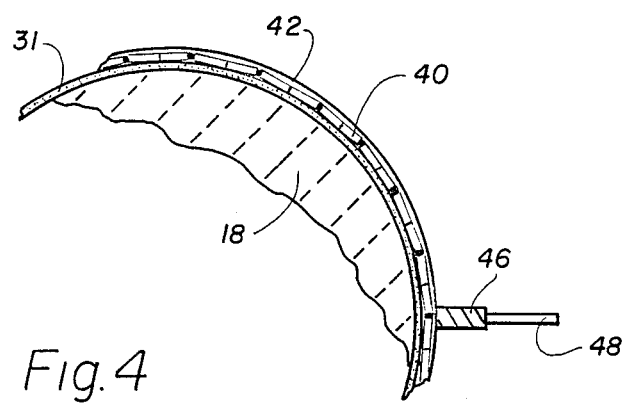
FIG. 4 is a view in section taken along line 4—4 of FIG. 3.

Referring now to FIGS. 2, 3 and 4, the electrode 30 comprises a thin film 31 applied to the surface of a BASE separator 18 shown in cylindrical form. The film has a thickness below 1 micrometer, generally less than 0.5 micrometers, preferably from 0.1 to 0.6 micrometers. The film is preferably formed of molybdenum or tungsten with a porosity from 5 to 40% usually from 15 to 25%. The film is preferably applied by vapor deposition under vacuum. Magnetron sputter application of molydenum or tungsten vapor deposits a porous film showing columnar morphology with clumps of metal clusters forming the columns with cracks between the clusters.

The grid 33 includes a thin, expanded, metal mesh current collector 40 having at least 20% open area, preferably from 60 to 80% so that there is minimum flow impedance to the sodium vapor. The grid can be formed by forming slits in a sheet of metal and then stretching and expanding the sheet to form diamond-shaped openings 44. The expanded metal mesh 40 is wrapped around the BASE tube 18.

The metal mesh 40 is electrically connected to the load 27 by connectors which surround the metal mesh. The connectors can be a helical connector or can be formed by wrapping a plurality of loop connectors 42 around the mesh. At least two connectors are provided, one near the top and one near the bottom edges of the metal mesh 40. Preferably the connectors 42 are evenly spaced to form a matrix of diamond-shaped openings 44. The tie wire connectors connect to a bus wire 46 having a terminal 48. The expanded strips can be held in place by mechanical contact. Metal mesh can also be brazed to the thin electrode film and to the tie connectors to improve mechanical integrity and to provide lower impedance contact.

EXPERIMENTAL

Very thin Mo and W porous metallic electrodes were formed by magnetron sputtering from cylindrical targets under a pressure of 5 to 12 millitorr argon, onto a rotating masked BASE tube (Ceramatec, Inc., 15 mm O.D., 1.2 mm wall, 300 mm long, lithia-stabilized sodium beta''-alumina). The base pressure of the sputtering system is typically $2.5 \times 10^{-7}$ torr, no bias or heating of the substrate is used, and the deposition rate is usually 14 Å/s. BASE tubes are kept under vacuum or in an argon filled glove-box at all times before the experiments, except during transfers and wiring of electrode contacts to the feedthroughs. BASE tubes are evacuated for twelve to sixteen hours in the sputtering system prior to porous electrode deposition.

Current collector grids, as shown in FIGS. 2-4, for the W and Mo electrodes were constructed of a single cylindrical wrapping of expanded nickel diamond grid mesh, original thickness 0.127 mm, Delker Corp.) which was tied in place by loops of 0.5 mm Mo wire separated from each other by about 1.0 mm. Since nickel has a linear thermal expansion coefficient, in $K^{-1}$, $(13.3 \times 10^{-6})$ substantially greater than those of BASE $(7.4 \times 10^{-6})$, Mo $(5.4 \times 10^{-6})$, and W $(4.5 \times 10^{-6})$, the nickel grid bonded strongly and permanently to both the electrode and tie-wires on heating to AMTEC operation temperature.

Co-sputtered Pt/W compositions, usually 2 um thick, were deposited on BASE tubes by first sputtering a W sublayer, followed by co-sputtering Pt and W, and finally sputtering a pure Pt layer. The result is a graduated composition from 100% W to 100% platinum at the outer surface of the electrode. Typically, these electrodes appear to be very non-porous: porosity is less than 10%. Expanded nickel mesh current collection grids were also utilized for efficient current distribution on Pt/W electrodes in these experiments.

Sheet resistance measurements and voltage profiles were obtained on other electrodes which had a current-voltage lead pair to each of 2 or 4 brazed 0.5 mm Mo wire contact loops. The current was supplied with a power supply (Kepco model JOE 15-6 MVP, Flushing, N.Y.) and monitored with a digital multimeter. The voltage was measured with a digital multi-function meter. Voltage profiles were obtained on these electrodes by discharging the electrode through one contact while monitoring the voltage at each of the four contacts.

Small patch and ring electrodes with areas of 0.3 to 1.3 cm$^2$ were used for ac impedance measurements. However, ac impedence data of larger electrodes were obtained in some instances.

Current interrupt measurements were carried out by establishing a steady-state current in an electrode and then triggering a fast FET switch with a voltage pulse, to interrupt the steady-state current flow. The voltage of the electrode was monitored with a Nicolet digital oscilloscope. The immediate voltage change corresponds to the total ohmic voltage drop within the cell. The remaining voltage difference, with respect to open circuit, is due to concentration polarization and capacitance.

The experiments and equipment used to obtain other data have been described in detail previously. (1, 2, 3, 4)

RESULTS AND DISCUSSION

A compilation of sheet resistance measurements is given in Table I for various thicknesses of Mo and W electrodes, both at room temperature and at AMTEC operating temperatures.

TABLE 1

Typical sheet resistances observed for porous, columnar, magnetron sputtered Mo and W films on cylindrical BASE substrates.
Four-probe measurements do not include contact resistance, two-probe measurements include contact resistance.

| Nominal Thickness (um) | Sheet Resistance at 300K Ohms/square | Sheet Resistance at AMTEC Operating Conditions 1000–1200K Ohms/square |
|---|---|---|
| Molybdenum Electrodes | | |
| 0.15 | 62.2 four-probe | 90,000 four-probe |
| 0.30 | 2.65 four-probe | 4,000 four-probe |
| 0.45 | 2.67 two-probe | 5.9 two-probe |
| 0.5 | 1.38 four-probe | |
| 0.6 | 1.12 four-probe | 60 four-probe |
| 1.0 | 0.282 four-probe | |
| 1.4 | 0.263 four-probe | 0.98 four-probe |
| 2.5 | 0.34 two-probe | 0.42 two-probe |
| Tungsten Electrodes | | |
| 0.5 | 2.01 four-probe | 6.6 four-probe |
| 1.8 | 0.60 four-probe | 1.88 four-probe |

There are some irregularities, especially among the thinner electrodes, presumably caused by minor variations in the sputtering conditions and the BASE tube surface. The two-probe measurements include the contact resistances between the probes, the braze, and the electrode. Using the data from two-probe and four-probe measurements on the same electrodes, this resistance has been calculated to be on the order of 0.1 ohm per contact. This is somewhat large and in an optimized device, it is estimated that it can be reduced by as much as one order of magnitude.

Other impedances for the device with the molybdenum grid on a 0.5 micrometer thick Mo electrode film are provided in the following Table 2.

TABLE 2

| | OHM/cm$^2$ |
|---|---|
| BASE Internal Impedance Tube with 0.065–0.120 cm wall thickness | 0.1–0.2 |
| Sodium flow impedance | 0.1 |
| Electronic Resistance | |
| a. Film (5 micrometers thick) | 0.06 |
| b. Grid lines (0.04 cm thick) | 0.10 |
| c. Tie Wires (0.05 cm thick) | 0.02 |
| d. Bus lines (0.127D) | 0.07 |
| Total Impedance | 0.45–0.55 OHM/cm$^2$ |

The current-voltage curves characteristic of typical thin Mo electrodes with current collecting grids are not significantly different from those of thicker Mo sputter-deposited films. The appearance of the current-voltage characteristic is quite insensitive to morphology or thickness of the electrode. The current and power densities of a very thin electrode without a collector grid will be smaller than those of one with a grid. With the higher sheet resistance of very thin electrodes, the area surrounding the current collector that is effectively utilized will be smaller. Therefore, a very thin electrode must have a collector grid with a characteristic grid spacing such as in the expanded metal mesh of the invention which will optimize the effective area of the electrode utilized, and will minimize the effective sheet resistance of the grid/film combination.

Higher power densities obtained with very thin Mo electrodes having collector grids are believed due to the reduced Na$^o$ vapor diffusion resistance and the collector grid offsetting the increase in electrode sheet resistance. Very thin electrodes will exhibit degradation with time that is much less dramatic than that of thicker Mo electrodes. Unlike the thicker electrodes which typically show decay in power density to 20-30% of the initial value, an 0.5 um Mo electrode had a power density of 80% of initial after almost 100 hrs. and was significantly higher in power than an otherwise similar 1.0 um Mo electrode. In the case of W electrodes also, it is clear that thinner sputtered electrodes with current collector grids and otherwise similar columnar morphology show superior performance. The effects of Na$_2$MoO$_4$ or Na$_2$WO$_4$ in very thin electrodes are minimized, since (a) less will be present to begin with and it will be lost quickly, and (b) its enhancing effect over pure sodium vapor flow will be less since the vapor flow pressure drop has been substantially reduced.

Experiments were carried out in JPL's Electrode Test Cell (ETC) for preliminary screening, fundamental measurements and initial lifetime data on different electrode compositions. The experimental procedures and equipment used to obtain data were previously described in detail by Bankston et al (1) and Williams et al (3)(4).

Figure 5:
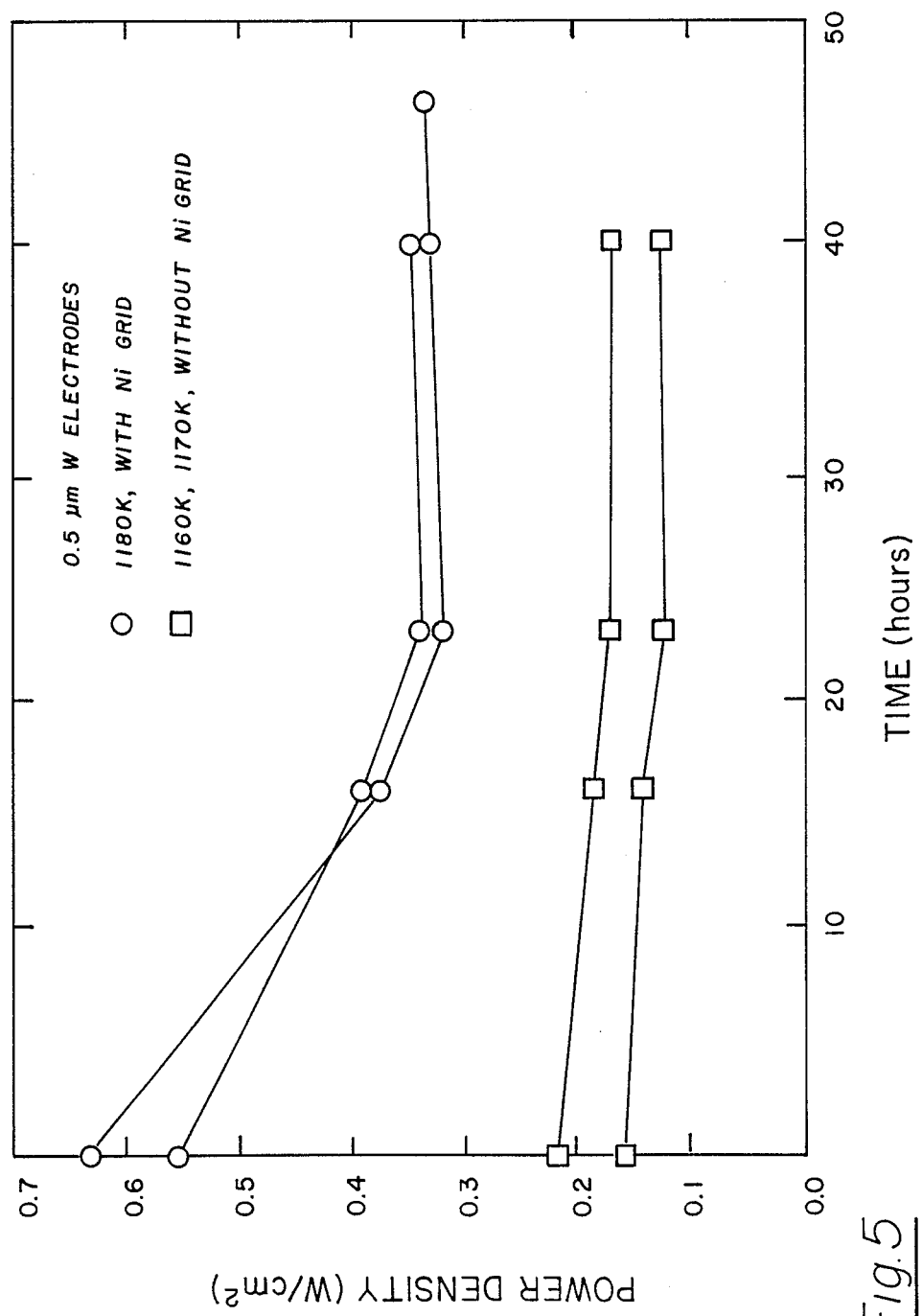
FIG. 5 is a series of curves showing a comparison of the performance of thin W film electrodes with and without grids.

A comparison of tungsten electrode performance with and without a current collection grid is shown in FIG. 5. All electrode films in FIG. 5 were 0.5 $\mu$m thick. The data show that the current collection grid improved the power output by 50–100%. Current collection for the electrodes without the grid was obtained by means of a single turn of 0.5 mm diameter Mo wire wrapped around a 1 cm wide electrode.

Though similar power densities were achieved with the grids formed of molybdenum strips secured to the BASE stube with wire loops, the wired grids were difficult to fabricate and did not provide as secure an attachment to the electrode film.

Figure 6:
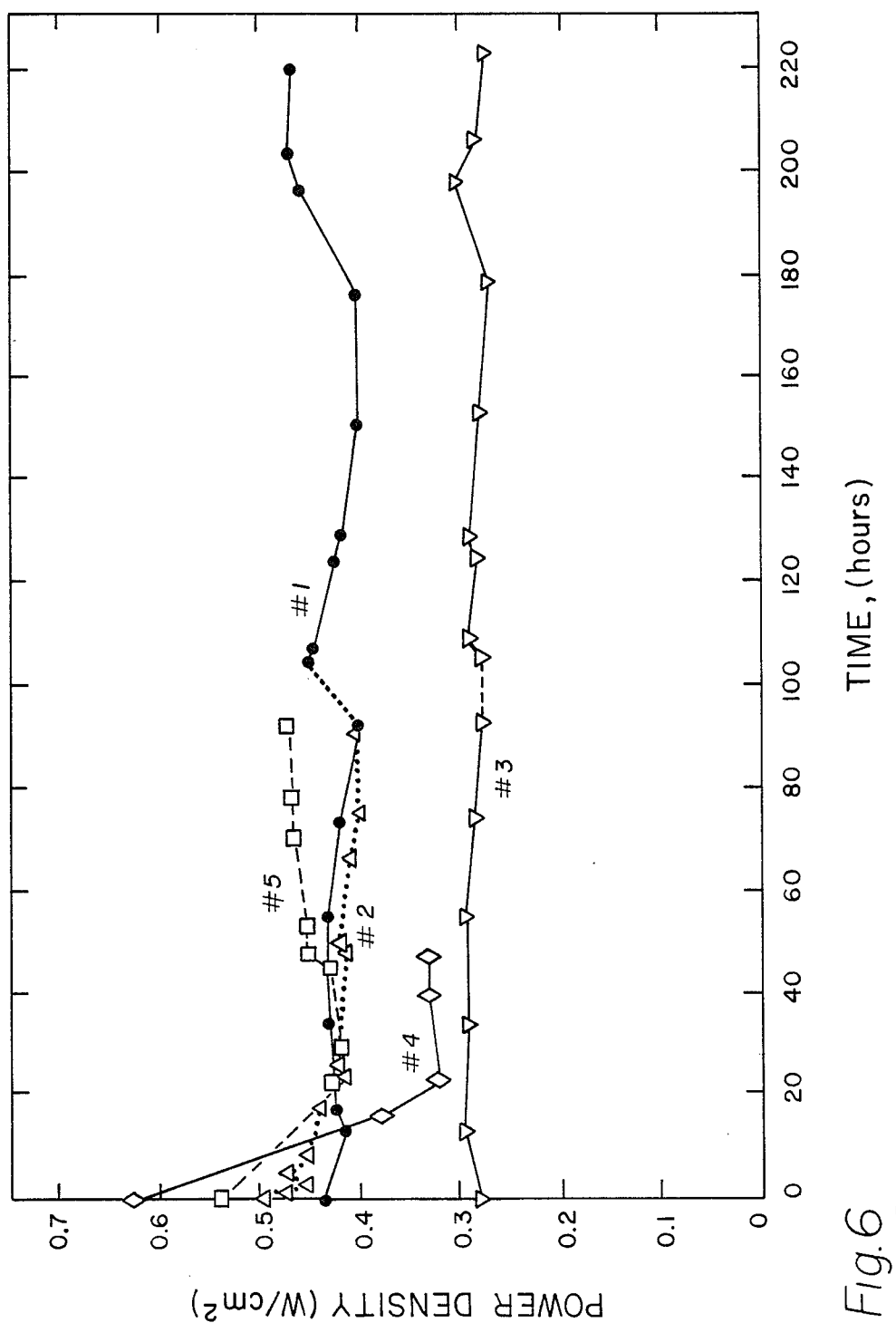
FIG. 6 is a series of curves showing a comparison of the maximum power densities for AMTEC devices with 0.5 to 2.5 micrometer Mo or W film electrodes operated at 1073–1150K as follows.

Results of lifetime experiments in the ETC for other electrodes are shown in FIG. 6. Thinner (less than 1 micrometer) sputtered molybdenum films (#2) overlayed with a Ni expanded metal current collection grid compare favorably with the power produced from the best, stable molybdenum electrode morphology (#1). SEM examination of the thin electrodes shows the morphology to be more porous than thicker (untreated) electrodes. The very thin films have a relatively low impedance to neutral sodium vapor flow and the overlying grid minimizes in-plane electronic sheet resistance. Electrode #3 is a very thin molybdenum film without a grid. It shows stable performance, but since it has no overlying current collector grid, it exhibits lower power density due to high sheet resistance.

Electrode #4 shows the results for a very thin tungsten film. Power densities for tungsten electrodes are generally lower than those for molybdenum. This is presumably due to the fact that tungsten films are considerably less porous (about 10 percent porosity or less) than molybdenum films. Power densities leveled off at about 50 hours at high temperature. Further changes, if any, occur more slowly over much longer periods based on the flat performance at 100-200 hours.

Electrode #5 is a Pt/W composition about 3 micrometers thick. The electrodes are non-porous (less than 10% porosity) and the porosity is usually in the form of cracks. These electrodes with the expanded nickel mesh current collector again produce stable power densities of 0.4 to 0.5 W/cm$^2$. Because the Pt/W alloy has a relatively high sheet resistance, on the order of 100 ohm/square for a 3 micrometer film, electrodes without grids gave power densities lower by a factor of five, <0.1 W/cm$^2$.

An AMTEC device containing a film-grid electrode of the present invention exhibits low maintenance, high durability and efficiency with ability to use high-temperature combustion, nuclear or solar heat sources. The AMTEC's high specific power, simplicity, potential long life and general heat source characteristic are desirable for remote power applications such as spacecraft power sources, communication relay stations, weather buoys, military equipment, locomotives, and construction sites The efficiency of an AMTEC is independent of size. This recommends the AMTEC as a means for locally generating electrical power from chemical fuels in total energy systems (cogeneration). As a high temperature topping cycle for a conventional steam power plant, the AMTEC could accept input heat at 1100 to 1300K and produce steam at 800K while adding 10 to 15 percent to the plant's overall generating efficiency. As an energy converter for sodium-cooled nuclear power plants, an AMTEC energy converter would eliminate at least one heat exchanger (sodium to water) plus all high-pressure steam piping and turboalternators.

In the transportation field, the AMTEC could serve as an outboard battery charger in an AMTEC-battery hybrid electric vehicle, generating high-amperage direct current for continuous battery charging, at an efficiency comparable to a central utility from the steady-state combustion of liquid fuel on board the vehicle. Such a vehicle could have the range of a vehicle with a conventional internal combustion engine. The AMTEC could be adapted to burn any type of gaseous, liquid, or solid fuel. Emission control would be much easier for the ambient-pressure continuous combustion of the AMTEC than for the transient combustion of an internal combustion engine. The question of safety posed by the AMTEC's liquid sodium should be solvable because the amount of sodium would be small enough to protect or manage in an accident. It should be possible to build a 20-kW AMTEC with an inventory of less than 500 g of sodium.

It is to be realized that only preferred embodiments of the invention have been described and that numerous substitutions, modifications and alterations are permissible without departing from the spirit and scope of the invention as defined in the following claims.

I claim:

1. An electrode for an alkali metal thermoelectric converter comprising in combination
   a body of solid, microcrystalline, ceramic electrolyte capable of transporting sodium ions from a first surface to a second surface;
   a film of a first metal applied to one of said surfaces, said metal being non-volatile at a temperature up to 1300K and including an early transition metal; and
   an open, metal current collector grid applied to the film, said metal of the current collector having a coefficient of thermal expansion greater than that of the solid electrolyte, and
   a restraining element covering the open grid.

2. An electrode according to claim 1 in which the solid electrolyte is beta-alumina or beta''-alumina.

3. An electrode according to claim 1 in which the first metal is selected from Groups IVB, VB and VIB of the Periodic Table and the film has a porosity from 10% to 40%.

4. An electrode according to claim 3 in which the film is formed by magnetron sputtering.

5. An electrode according to claim 3 in which the current collector grid has at least 20% open area.

6. An electrode according to claim 5 in which the grid is formed of nickel or cobalt, or copper clad with nickel, cobalt, molybdenum, or tungsten.

7. An electrode according to claim 5 in which the current collector grid is a sheet of expanded metal.

8. An electrode according to claim 7 in which the body is a cylinder and the restraining element includes a plurality of cross-members surrounding said cylinder element.

9. An electrode according to claim 8 in which the cross-members are formed of the same metal as the metal film.

10. An electrode according to claim 9 further including a bus bar electrically connecting the cross members.

11. An electrode according to claim 3 in which the film metal is selected from tungsten, molybdenum, niobium or tantalum.

12. An electrode according to claim 11 in which the first metal is molybdenum.

13. An electrode according to claim 3 in which the metal forming the film is an alloy in which one constituent is molybdenum or tungsten and the other constituent is platinum, rhodium, or iridium.

14. An electrode according to claim 13 in which the cross-members are composed of a metal selected from tungsten, molybdenum, niobium, or tantalum.

15. A method of converting thermal energy to electrical energy comprising the steps of:

placing liquid sodium at a first temperature in contact with a first surface of a solid, microcrystalline, ceramic electrolyte, transporting sodium in ionic form through the solid electrolyte to a second surface at lower pressure and lower temperature, said second surface having thereon a film that is non-volatile at a temperature up to 1300K, and is formed of refractory metal insoluble in sodium and a metal grid having a thermal coefficient of expansion greater than said solid electrolyte applied to the film; and developing an electrical potential between said surface and said liquid sodium.

16. A method according to claim 15 in which the solid electrolyte is beta-alumina or beta"-alumina, and the metal is selected from Groups IVB, VB or VIB of the Periodic Table.

17. A method according to claim 15 in which the grid further includes a plurality of cross members electrically joining the grid lines and a bus bar connected to the cross-members.

18. A method according to claim 15 in which the sodium leaves the second surface as a vapor and further including the steps of condensing the vapor to liquid sodium and returning the liquid sodium to said first surface.

19. A method according to claim 15 further including the steps of heating the sodium to said first temperature by transferring heat from a heat source and condensing said vapor by transferring heat from the vapor to a condenser.

* * * * *

UNITED STATES PATENT AND TRADEMARK OFFICE
CERTIFICATE OF CORRECTION

PATENT NO. : 4,871,626
DATED : October 3, 1989
INVENTOR(S) : Roger M. Williams

It is certified that error appears in the above-identified patent and that said Letters Patent is hereby corrected as shown below:

Title page, line (75) after "Calif." insert --; Bob L. Wheeler, Houston, Texas; Barbara Jeffries-Nakamura, San Marino, Calif.; C. Perry Bankston, Studio City, Calif.; Terry Cole, La Canada, Calif.; Maria E. Loveland, Pasadena, Calif.--

Col 5, line 3 - cancel "," after wall.
line 6 - cancel "," after 20.
line 20 - change "dium" to --occurs at the liquid sodium-BASE interface when sodium--.
line 49 - change "$Li_1 \over 3$" to $Li_{1/3}$--.
line 50 - change "mi" to --microcrystalline--.

Col 6, line 4 - change "molydenum" to --molybdenum--.
line 39 - change "$10^-$" to --$10^{-6}$--.
line 59 - change "um" to --μm--.

Col 7, line 14 - change "impedence" to --impedance--.
line 15 - change "impedence" to --impedance--.
line 46 - change "um" to --μm--.

UNITED STATES PATENT AND TRADEMARK OFFICE
CERTIFICATE OF CORRECTION

PATENT NO. : 4,871,626

DATED : October 3, 1989

INVENTOR(S) : Roger M. Williams

It is certified that error appears in the above-identified patent and that said Letters Patent is hereby corrected as shown below:

Col 8, line 42 - change "um" to --µm--.
      line 44 - change "um" to --µm--.

Col 9, line 45 - change "characteristic" to --characteristics--.
      line 49 - after "sites" add --.--.

Signed and Sealed this

Tenth Day of November, 1992

Attest:

DOUGLAS B. COMER

Attesting Officer     Acting Commissioner of Patents and Trademarks